US006294603B1

(12) United States Patent
Sheen et al.

(10) Patent No.: US 6,294,603 B1
(45) Date of Patent: Sep. 25, 2001

(54) RESIN COMPOSITION CONTAINING METAL SALT

(75) Inventors: Yuung-Ching Sheen, Hsinchu; Pin-Sheng Wang, San-Chong; Mei-Ling Tong, Yang-Mei; Ya-Hui Lin; Juh-Shyong Lee, both of Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/634,572

(22) Filed: Aug. 8, 2000

(30) Foreign Application Priority Data

Feb. 3, 2000 (TW) .................................................. 89101933

(51) Int. Cl.$^7$ ................................ C08K 5/04; C08K 5/09
(52) U.S. Cl. ......................... 524/394; 524/400; 524/398; 524/435; 524/436
(58) Field of Search ..................................... 524/394, 400, 524/436, 435, 398

(56) References Cited

U.S. PATENT DOCUMENTS

| 4,542,095 | * | 9/1985 | Steklenski et al. | 430/527 |
| 5,346,959 | * | 9/1994 | Goman et al. | 525/187 |
| 5,998,546 | * | 12/1999 | Li et al. | 525/231 |

\* cited by examiner

*Primary Examiner*—Kriellion A. Sanders
(74) *Attorney, Agent, or Firm*—Sughrue, Mion, Zinn, Macpeak & Seas, PLLC

(57) ABSTRACT

The present invention provides a metal salt-containing resin composition, which comprises (a) a hydrophilic polymer which is a polymer or copolymer of an ethylene oxide-containing monomer, and (b) 0.1 to 30% of a metal salt, based on the weight of the hydrophilic polymer. The resin composition of the present invention has long lasting anti-static properties and a lower surface resistivity than the hydrophilic polymer alone.

21 Claims, No Drawings

RESIN COMPOSITION CONTAINING METAL SALT

BACKGROUND OF THE INVENTION

1. Field of the Invention

The present invention relates to a resin composition containing a metal salt. This resin composition has long lasting antistatic properties and a low surface resistivity.

2. Description of the Prior Art

Due to the advangtages of good mechanical properties such as impact resistance, polymer materials have been V utilized extensively. Plastic materials can be processed into various kinds of plastic articles using variety processing methods such as extrusion, calendering, injection, and compression. However, due to the insulation characteristics of polymer materials, static electricity easily accumulates on the plastic articles made therefrom. Slight static electricity makes people feel uncomfortable, while severe static electricity can even cause industrial damage.

In recent years, electronic devices follow the trend of high-density and high-speed. Therefore, they are more sensitive to the static electricity than before. A static charge with a potential of 50 to 300 V (volt) can cause severe damage to electronic devices. Since a human body carries an average of 1 to 2 kV (kilovolt) of static electricity, when a person touches the electronic devices, the static electricity carried by the human body can bring functional damage and memory loss to the electronic devices. Therefore, during manufacturing or transporting, the electronic devices should be put in containers made of antistatic materials to dissipate static electric charges.

Several solutions have been proposed to prevent the electrostatic damage. The first solution is to coat a layer of antistatic agent on the plastic surface by, for example, a dipping, wiping, or spraying process. Such an antistatic agent is usually a moisture-absorbing surfactant. One drawback to this kind of antistatic agent is that the antistatic effect decreases as the ambient humidity decreases. Moreover, the coating of this antistatic agent can easily be peeled off from the plastic surfaces, thus contaminating the electronic devices. Once the antistatic coating is peeled off, the plastic material should be treated again to form a new coating, which is very inconvenient.

The second solution to overcome the electrostatic damage is to incorporate a migration type antistatic agent into the polymer matrix during the manufacture of the plastic material. By means of the migration of such low molecular weight antistatic agent to the surface of plastic material, the antistatic agent will absorb water molecules in the atmosphere to form a water molecule layer. The static electric charges can thus be dissipated. Examples of this kind of antistatic agents include N-oxyethylated alkylamines disclosed in U.S. Pat. No. 3,575,903, alkanolamines and polyalkylene glycols disclosed in U.S. Pat. No. 3,625,915, and lauric diethanolamide disclosed in U.S. Pat. No. 3,873,645. The drawback of this type of low molecular weight antistatic agent is that it will migrate and adhere to the plastic surface, or even bloom on the surface of the plastic article. Moreover, the antistatic properties will gradually decrease after a long period of use.

The third solution to overcome the electrostatic damage is to incorporate a high molecular weight antistatic agent during the manufacture of plastic materials. Such an antistatic agent generally imparts permanent (long lasting) antistatic properties to the plastic material and can be classified into two types in terms of its compatibility with the polymer matrix. The first type of antistatic agent has a limited compatibility with the polymer matrix. Therefore, a highly dense continuous phase of the antistatic agent will be formed on the surface of the plastic article. Such an antistatic agent phase distributed on the surface can thus provide antistatic effect. However, in order to make this antistatic agent distribute appropriately, a compatibilizer is generally added in the system. In case no compatibilizer is added or an unsuitable compatibilier is added, the properties of the polymer matrix will be adversely affected. Examples of this kind of antistatic agents include the polyether ester amide disclosed in Japanese Pat. Publication No. 4-337344 and U.S. Pat. No. 5,338,795, and the epichlorohydrin copolymer disclosed in U.S. Pat. Nos. 4,588,733, 4,775,716, 4,857,590, and 5,216,046. The second type of antistatic agent, which is obtained by copolymerizing an alkylene oxide-containing vinyl monomer with an ordinary vinyl monomer, has a better compatibility with the polymer matrix. When such an antistatic agent is blended with a polymer matrix, the vinyl group can provide compatibility, and the alkylene oxide group can provide antistatic properties. Since this antistatic agent has suitable compatibility with the polymer matrix, it is distributed evenly in the matrix after blending. This can impart the plastic with long lasting antistatic properties and improved mechanical properties. This kind of antistatic agent can be found in U.S. Pat. No. 4,543,390, Japanese Patent Publication No. 60-144314, No. 60-195143, No. 61-261344, No. 62-48756, and No. 1-126358. However, the antistatic properties still need to be improved.

Adding other additives into a polymer matrix is another way to improve antistatic properties. In U.S. Pat. No. 4,872,910, LiCl and a polyethylene oxide (PEO) are added in an acrylic latex. However, since the PEO is introduced by means of addition, the compatibility is not satisfied. In U.S. Pat. No. 5,683,862, a lithium salt and an ethylene oxide/propylene oxide (EO/PO) copolymer are added in an acrylic latex. The EO/PO copolymer is also introduced by means of addition, the compatibility is not satisfied either. In U.S. Pat. No. 5,283,008, a metal oxide is added in a poly(alkylene oxide)vinyl carboxylic ester. In U.S. Pat. No. 5,998,546, an antistatic resin composition is disclosed, which includes a hydrophilic copolymer and a thermoplastic resin. The hydrophilic copolymer includes a hydroxide of an alkali metal and a monomer mixture.

SUMMARY OF THE INVENTION

The object of the present invention is to solve the above-mentioned problems and provide a resin composition with long lasting antistatic properties and a low surface resistivity, in which the resin composition contains a metal salt.

To achieve the object of the present invention, the metal salt-containing resin composition of the present invention includes:

(a) a hydrophilic polymer which is a polymer or copolymer of an ethylene oxide-containing monomer, the ethylene oxide-containing monomer being represented by the formula (I)

$$R_1CH=CHR_2O(C_2H_4O)_nR_3 \qquad (I)$$

wherein $R_1$ is H or $C_{1-18}$ alkyl, $R_2$ is selected from the group consisting of a polypropylene oxide chain, alkylene, phenylene, carbonyl, ether, hydrocarbyl containing at least one benzene ring, and hydrocarbyl containing at least one benzene ring and at least one ether group, $R_3$ is selected from the group consisting of H, $C_{1-6}$ alkyl, sulfonyl, an amino group (—$NH_2$), and an ammonium sulfonate group (—$SO_3NH_4$), and n is from 3 to 50; and (b) 0.1 to 30% of a metal salt, based on the weight of the hydrophilic polymer.

DETAILED DESCRIPTION OF THE INVENTION

The metal salt-containing resin composition of the present invention has antistatic properties. The hydrophilic polymer (a) which provides the antistatic effect can be prepared by bulk polymerization, solution polymerization, emulsion polymerization, or self-emulsion polymerization. The conditions for the self-emulsion polymerization process are similar to those for the emulsion polymerization process, except that no additional surfactants are required to maintain the latex stability in the self-emulsion polymerization process. The hydrophilic polymer prepared by the self-emulsion polymerization process includes no surfactant adsorbed thereon. For this reason, there will be no problems from residual surfactants during the drying and pelletization process. Therefore, the molded plastic articles made of a blend of the hydrophilic polymer and a polymer matrix do not have a degraded surface finish or poor post-processability.

According to the present invention, the alkylene oxide-containing monomer represented by formula (I) is composed of a hydrophilic group of a polyethylene oxide chain, i.e., $(C_2H_4O)_n$, on one end, and a lipophilic group on the other end. Therefore, this monomer can serve as a surfactant itself. When this monomer undergoes an emulsion polymerization reaction, whether it is homopolymerization by itself or copolymerization with other monomers, no additional surfactants are needed to maintain the stability of the emulsion.

In formula (I), $R_2$ can be a polypropylene oxide chain, alkylene, phenylene, carbonyl, ether, hydrocarbyl containing at least one benzene ring, or hydrocarbyl containing at least one benzene ring and at least one ether group. When $R_2$ is a polypropylene oxide chain, the repeating number of the propylene oxide is preferably 5 to 30.

When $R_3$ is a sulfonyl group, amino group, or ammonium sulfonate group, the ethylene oxide-containing monomer has anionic interfacial activity. When $R_3$ is hydrogen or alkyl, the ethylene oxide-containing monomer has non-ionic interfacial activity.

In formula (I), the repeating number n of ethylene oxide is from 3 to 50, preferably from 5 to 40, and most preferably from 10 to 20. Too large an n value will cause too viscous a mixed solution of monomers, which is not beneficial for processing. While when the n value is too low, the antistatic effect of the hydrophilic polymer obtained becomes less obvious. Moreover, self-emulsion polymerization can not be conducted since the ethylene oxide-containing monomer has too low an interfacial activity.

According to the present invention, the ethylene oxide-containing monomer represented by formula (I) can be a commerially available one. For example, monomers under the trade name of RN-10, RN-20, RN-30, HS-20, and N-30 from Dai-ichi Kogyo Seiyaku Co., can be used, and their formulae are shown below. In the RN series and HS-20, $R_2$ indicates hydrocarbyl containing a benzene ring. In N-30, $R_2$ indicates hydrocarbyl containing a benzene ring and an ether group.

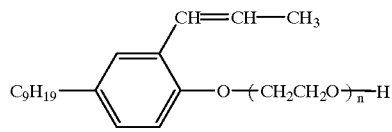

RN-10: n = 10
RN-20: n = 20
RN-30: n = 30

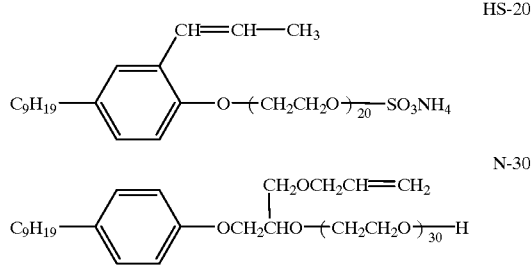

The hydrophilic polymer used in the present invention is a polymer or copolymer of an ethylene oxide-containing monomer. When the hydrophilic polymer is a copolymer, it is preferably a copolymer of an ethylene oxide-containing monomer represented by formula (I) and a vinyl comonomer. Preferably, the ethylene oxide-containing monomer is used in amount of 3 to 80 weight percent, and the vinyl comonomer is used in amount of 20 to 97 weight percent. Too low a ratio of the ethylene oxide-containing monomer will cause poor antistatic properties, while too high a ratio will adversely affect processing.

The vinyl comonomers suitable for use in the present invention are not limited as long as they can be copolymerized with the ethylene oxide-containing monomer. The comonomer can be an aromatic vinyl monomer, methacrylate monomer, acrylate monomer, vinyl cyanide monomer, or a mixture thereof. Representative examples include styrene, butyl acrylate, methyl methacrylate, acrylic acid, acrylonitrile, and mixtures thereof.

The vinyl comonomer is preferably composed of about 50–100 weight percent of a monomer mixture of an aromatic vinyl monomer, a methacrylate monomer, and an acrylate monomer, and about 0–50 weight percent of a vinyl cyanide monomer.

During polymerization, catalyst, such as persulfate or Redox compounds, can be added. And the addition sequence of the monomers or its mixed solution is not limited. Conventional techniques can be employed. For example, the monomers can be added in batch, continuously, or preferably in a multi-stage manner. When the monomers are added in a multi-stage manner, a hydrophilic polymer with a core/shell structure can be obtained, which can meet the requirements for various polymer matrices.

The metal salt suitable for use in the present invention is preferably a salt of a monovalent to trivalent metal ion. Examples of suitable salts include monovalent alkali metal (Group IA) salts, such as lithium, sodium, or potassium salts; divalent alkaline earth metal (Group IIA) salts, such as beryllium, magnesium, or calcium salts; and trivalent salts, for example iron(III) salts, with various counter-ions, such as $ClO_4^-$, $BF_4^-$, $CF_3SO_3^-$, $PF_6^-$, $F^-$, $Cl^-$, $Br^-$, $I^-SCN^-$, $NO_3^-$ or 7,7,8,8-tetracyanoquinodimethane ($TCNQ^-$). In addition, the metal salt can be a salt of Group IB metal such as copper, or a salt of Group VIIIB metal, such as nickel or palladium.

Representative preferred metal salts include LiCl, LiF, KCl, $CaCl_2 \cdot 2H_2O$, $PdCl_2$, $CuCl_2 2H_2O$, $NiCl_2 \cdot 6H_2O$, $FeCl_3$, NaSCN, NaI, $LiSO_3CF_3$, LITCNQ, and $LiClO_4$.

The metal salt-containing resin composition of the present invention can be obtained by directly mixing the hydrophilic polymer and the metal salt, or by homopolymerizing the ethylene oxide-containing monomer or copolymerizing the ethylene oxide-containing monomer with other monomers at the presence of the metal salt. That is, the metal salt can be added after or before the hydrophilic polymer is formed.

The resin composition of the present invention can also be obtained by combining a mixture of various hydrophilic polymers and a mixture of various metal salts.

According to the present invention, after the metal salt is added, the surface resistivity of the hydrophilic polymer can be decreased. This is because the metal salt can be complexed with the ethylene oxide group, preferably polyethylene oxide group, on the hydrophilic polymer. By such complexation, the hydrophilic polymer can become more stable, and the surface resistivity can be decreased to an extent lower than that of the hydrophilic polymer alone.

The metal salt-containing resin composition of the present invention can further include a compound containing two or more than two vinyl groups, which is different from the vinyl comonomer. Such a compound with at least two vinyl groups can serve as a cross-linking agent, which can be cross-linked with the ethylene oxide-containing monomer of the present invention by means of the vinyl groups. Thus, the properties of the polymer matrix can be further improved. Representative examples of this cross-linking agent with two vinyl groups are dimethylene glycol dimethacrylate and divinyl benzene.

The metal salt-containing resin composition of the present invention can be blended with a polymer matrix to give an antistatic resin polymer blend. The polymer blend can include 99 weight percent to 1 weight percent of the metal salt-containing resin composition of the present invention, and 1 weight percent to 99 weight percent of a polymer different from the hydrophilic polymer of the present invention. Preferably, the antistatic polymer blend includes 50 weight percent to 5 weight percent of the metal salt-containing resin composition of the present invention, and 50 weight percent to 95 weight percent of a polymer different from the hydrophilic polymer of the present invention. Most preferably, the antistatic polymer blend includes 40 weight percent to 10 weight percent of the metal salt-containing resin composition of the present invention, and 60 weight percent to 90 weight percent of a polymer different from the hydrophilic polymer of the present invention. The polymer used for blending can be epoxy, PU, polyester, PVC (polyvinyl chloride), or various thermoplastic resins, such as ABS (acrylonitrile-butadiene-styrene terpolymer), HIPS (high impact polystyrene), or PMMA.

When the hydrophilic polymer of the present invention is a copolymer of the monomer of formula (I) (a macromolecular monomer with both hydrophilic and lipophilic groups) and a vinyl comonomer, the backbone of the hydrophilic copolymer is composed of the vinyl comonomer and the lipophilic group of the macromolecular monomer, and the side chain is composed of the polyethylene oxide chain of the macromolecular monomer. Thus, when the hydrophilic copolymer is blended with a polymer matrix, the backbone has good comparability with the resin matrix, and the polyethylene oxide side chain provides antistatic effect. Since the polyethylene oxide chain is chemically bonded with the copolymer, the antistatic agent still has good mechanical properties after blending. The finished plastic product will not have peeling or blooming phenomenon on the surface, and will not lose antistatic effect after washing or wiping. Therefore, such an antistatic resin composition has long lasting antistatic effect.

Since the metal salt-containing resin composition of the present invention has antistatic properties, it can be directly coated on an insulating material to serve as an antistatic coating. Or, alternatively, it can be blended with a suitable polymer and then coated on an insulating material. By either method, the surface resistivity of the insulating material can be effectively decreased.

In addition to be used as an antistatic coating, the metal salt-containing resin composition of the present invention and the antistatic polymer blend of the present invention can also be molded into variety antistatic products, such as antistatic films, antistatic bags, IC cover tapes, antistatic clothes, and dust free clothes. Also, they can be applied in semiconductors, electronic communication, and optoelectronic facilities.

The following examples are intended to illustrate the process and the advantages of the present invention more fully without limiting its scope, since numerous modifications and variations will be apparent to those skilled in the art.

EXAMPLES 1–7

Polymerization was conducted by using the monomers listed in Table 1. Water with two times the weight of the monomers was charged in a reactor, and then the mixed monomer solution was added in two stages. First, 20% of the mixed monomer solution was added. After 10 minutes of continuous stirring, potassium persulfate of 0.08 wt % of the total monomer weight was added to undergo the first stage of reaction. After 60 minutes of reaction, 80% of the mixed monomer solution was added continuously over two hours, and then potassium persulfate of 0.02 wt % of the total monomer weight was added to undergo the second stage of reaction. After 2 hours of reaction, a hydrophilic polymer was obtained. After drying and film forming, the hydrophilic polymer was determined on surface resistivity. The results are shown in Table 1.

EXAMPLES 8–11

The hydrophilic polymers obtained from EXAMPLES 1, 2, 4, and 5 were mixed thoroughly with LiCl at room temperature for 2 hours separately to afford the resin composition of the present invention. The amounts of LiCl were added such that the molar ratios of Li atom to the ethylene oxide group were as shown in Table 2. The resin composition was coated on an acrylic sheet, which was then determined on surface resistivity after drying. The results are shown in Table 2. Before coating, the acrylic sheet has a surface resistivity of higher than $10^{12} \Omega/\square$.

EXAMPLES 12–16

The hydrophilic polymer obtained from Example 2 was mixed thoroughly with various metal salts (see Table 3) at room temperature for 2 hours separately to afford the resin composition of the present invention. The resin composition was coated on an acrylic sheet, which was then determined on surface resistivity after drying. The results are shown in Table 3. Before coating, the acrylic sheet has a surface resistivity of higher than $10^{12} \Omega/\square$.

EXAMPLES 17–19

The same procedures as described in Examples 1–7 were employed except that the monomers used was changed as shown in Table 4 and a cross-linking agent (SR-231 or DVB) was added during the second stage of monomer addition. A hydrophilic polymer containing a cross-linking agent was obtained. After drying and film forming, the polymer was determined on surface resistivity, which is shown in Table 4.

EXAMPLE 20

The hydrophilic polymer obtained from Example 17 was mixed thoroughly with LiCl at room temperature for 2 hours to afford the resin composition of the present invention, which has cross-linking properties. The amounts of LiCl were added such that the molar ratios of Li atom to the ethylene oxide group were as shown in Table 5. The resin composition was coated on an acrylic sheet, which was then determined on surface resistivity after drying. The results are shown in Table 5. Before coating, the acrylic sheet has a surface resistivity of higher than $10^{12} \Omega/\square$.

EXAMPLE 21

The hydrophilic polymer obtained from Example 4 was mixed thoroughly with LiCl at room temperature for 2 hours to afford the resin composition of the present invention. The amount of LiCl was added such that the lithium atom and the ethylene oxide of the hydrophilic polymer had a molar ratio (Li/EO) of 1/10. Then, the resin composition was added in amounts shown in Table 6 in 3M floor wax (BRITE-COTE, purchased from 3M company) thoroughly. The wax mixture was then coated on a PVC floor, and the surface resistivity is shown in Table 6.

TABLE 3

| Example | Metal salt | Li/EO 0 | 1/100 | 1/50 | 1/10 | 1/4 |
|---|---|---|---|---|---|---|
| | | Surface Resistivity ($\Omega/\square$) | | | | |
| 12 | LiCl | $5 \times 10^8$ | $3 \times 10^8$ | $6 \times 10^7$ | $3 \times 10^6$ | $2 \times 10^6$ |
| 13 | LiClO$_4$ | $5 \times 10^8$ | $9 \times 10^6$ | $7 \times 10^6$ | $7 \times 10^6$ | $4.5 \times 10^6$ |
| 14 | LiSO$_3$CF$_3$ | $5 \times 10^8$ | $10^7$ | $6 \times 10^6$ | $6 \times 10^6$ | $2.5 \times 10^6$ |
| 15 | LiF | $5 \times 10^8$ | — | $1.5 \times 10^9$ | $10^9$ | $1.5 \times 10^9$ |
| 16 | KCl | $5 \times 10^8$ | $4 \times 10^8$ | $1.5 \times 10^8$ | $1.5 \times 10^8$ | $1.5 \times 10^8$ |

Li/EO indicates the molar ratio of Li atom and the ethylene oxide group

TABLE 4

| Monomer | Example 17 | 18 | 19 |
|---|---|---|---|
| | Monomer amount (g) | | |
| SM | 40 | 40 | 40 |
| MMA | 40 | 40 | 40 |
| RN-30 | 10 | 10 | 10 |
| SR-231 | 10 | — | — |
| DVB | — | 10 | 20 |
| Surface Resistivity ($\Omega/\square$) | $8 \times 10^9$ | $5 \times 10^8$ | $2 \times 10^8$ |

SR-231: dimethylene glycol dimethacrylate from Tokoyo Kasei Organic Chemicals Co.
DVB: divinyl benzene from Tokoyo Kasei Organic Chemicals Co.

TABLE 1

| Monomer | Example 1 | 2 | 3 | 4 | 5 | 6 | 7 |
|---|---|---|---|---|---|---|---|
| | Monomer amount (g) | | | | | | |
| SM | 20 | 30 | 40 | 50 | 20 | 20 | 20 |
| BA | 20 | — | — | — | — | 50 | 20 |
| MMA | — | 10 | 40 | 40 | 40 | — | — |
| RN-20 | — | — | — | — | 40 | — | — |
| RN-30 | 60 | 60 | 20 | 10 | — | — | — |
| HS-20 | — | — | — | — | — | 30 | — |
| N-30 | — | — | — | — | — | — | 60 |
| Surface resistivity ($\Omega/\square$) | $3 \times 10^8$ | $5 \times 10^8$ | $4 \times 10^{10}$ | $8 \times 10^{10}$ | $4 \times 10^9$ | $10^8$ | $5 \times 10^8$ |

SM = styrene monomer
BA = butyl acrylate
MMA = methyl methacrylate

TABLE 2

| Example | Hydrophilic Polymer | Li/EO 0 | 1/100 | 1/50 | 1/10 | 1/4 | 1/2 |
|---|---|---|---|---|---|---|---|
| | | Surface Resistivity ($\Omega/\square$) | | | | | |
| 8 | Example 1 | $3 \times 10^8$ | $10^8$ | $7 \times 10^7$ | $1.5 \times 10^6$ | $8 \times 10^5$ | $3 \times 10^5$ |
| 9 | Example 2 | $8 \times 10^8$ | $5 \times 10^8$ | $3 \times 10^8$ | $3 \times 10^6$ | $10^6$ | $8 \times 10^5$ |
| 10 | Example 4 | $5 \times 10^8$ | $3 \times 10^8$ | $6 \times 10^7$ | $3 \times 10^6$ | $2 \times 10^6$ | $7 \times 10^5$ |
| 11 | Example 5 | $3 \times 10^9$ | $2 \times 10^9$ | $8 \times 10^8$ | $10^8$ | $8 \times 10^6$ | $1.5 \times 10^6$ |

Li/EO indicates the molar ratio of Li atom and the ethylene oxide group

TABLE 5

| Li/EO | 0 | 1/100 | 1/50 | 1/10 | 1/4 |
|---|---|---|---|---|---|
| Surface Resistivity ($\Omega/\square$) | $8 \times 10^9$ | $7 \times 10^9$ | $5 \times 10^9$ | $1.5 \times 10^9$ | $2 \times 10^5$ |

Li/EO indicates the molar ratio of Li atom and the ethylene oxide group

TABLE 6

| The addition amount of the resin composition | Surface resistivity ($\Omega/\square$) |
|---|---|
| 0% | $3 \times 10^{11}$ |
| 5% | $1.5 \times 10^{11}$ |
| 10% | $1.5 \times 10^{11}$ |
| 20% | $3 \times 10^8$ |
| 30% | $1.5 \times 10^6$ |

The addition amount of the resin composition is based on the weight of the 3M floor wax
The surface resistivity of the PVC floor is $10^{11}$ $\Omega/\square$ From the above data, it can be seen that the surface resistivity of the acrylic sheet can be decreased by means of coating a composition containing the hydrophilic polymer added with a metal salt. The more the metal salt is added, the lower the surface resisitivity becomes. When the resin composition containing the metal salt and hydrophilic polymer is added in a floor wax and then coated on a PVC floor, the surface resistivity of the floor can be decreased. The more the resin composition is added, the less the surface resistivity becomes.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A resin composition containing a metal salt, comprising:
   (a) a hydrophilic polymer which is a polymer or copolymer of an ethylene oxide-containing monomer, the ethylene oxide-containing monomer being represented by the formula (1)

$$R_1CH=CHR_2O(C_2H_4O)_nR_3 \quad (1)$$

wherein
   $R_1$ is H or $C_{1-18}$ alkyl,
   $R_2$ is selected from the group consisting of a polypropylene oxide chain, alkylene, phenylene, carbonyl, ether, hydrocarbyl containing at least one benzene ring, and hydrocarbyl containing at least one benzene ring and at least one ether group,
   $R_3$ is selected from the group consisting of H, $C_{1-6}$ alkyl, sulfonyl, an amino group (—$NH_2$), and an ammonium sulfonate group (—$SO_3NH_4$), and
   n is from 3 to 50; and
   (b) 0.1 to 30% of a metal salt, based on the weight of the hydrophilic polymer, wherein the metal salt is a salt of a metal selected from the group consisting of a Group IA, a Group IIA, a Group IB, and a Group VIIIB metal.

2. The resin composition as claimed in claim 1, wherein in formula (I), $R_2$ is a polypropylene oxide chain, and the repeating number of the propylene oxide is 5 to 30.

3. The resin composition as claimed in claim 1, wherein in formula (I), $R_2$ is hydrocarbyl containing a benzene ring.

4. The resin composition as claimed in claim 1, wherein in formula (I), $R_2$ is hydrocarbyl containing a benzene ring and an ether group.

5. The resin composition as claimed in claim 1, wherein n is from 5 to 40.

6. The resin composition as claimed in claim 1, wherein the hydrophilic polymer is a copolymer of a monomer represented by formula (I) and a vinyl comonomer.

7. The resin composition as claimed in claim 6, wherein the monomer represented by formula (I) is used in amount of 3 to 80 weight percent, and the vinyl comonomer is used in amount of 20 to 97 weight percent.

8. The resin composition as claimed in claim 6, wherein the vinyl comonomer is selected from the group consisting of aromatic vinyl monomers, methacrylate monomers, acrylate monomers, vinyl cyanide monomers, and mixtures thereof.

9. The resin composition as claimed in claim 8, wherein the vinyl comonomer is selected from the group consisting of styrene, butyl acrylate, methyl methacrylate, acrylic acid, acrylonitrile, and mixtures thereof.

10. The resin composition as claimed in claim 1, wherein the metal salt is selected from the group consisting of lithium, sodium, and potassium salts.

11. The resin composition as claimed in claim 1, wherein the metal salt is selected from the group consisting of beryllium, magnesium, and calcium salts.

12. The resin composition as claimed in claim 1, wherein the metal salt is a salt of nickel.

13. The resin composition as claimed in claim 1, wherein the metal salt is a salt of copper.

14. The resin composition as claimed in claim 1, wherein the metal salt is a salt of palladium.

15. The resin composition as claimed in claim 1, wherein the metal salt is a salt of iron.

16. The resin composition as claimed in claim 1, which has antistatic properties.

17. The resin composition as claimed in claim 1, further comprising a compound containing two or more than two vinyl groups.

18. The resin composition as claimed in claim 17, wherein the compound containing two or more than two vinyl groups is dimethylene glycol dimethacrylate or divinyl benzene.

19. An antistatic polymer blend, comprising:
   (1) 99 weight percent to 1 weight percent of a metal salt-containing resin composition, which comprises:
   (a) a hydrophilic polymer which is a polymer or copolymer of an ethylene oxide-containing monomer, the ethylene oxide-containing monomer being represented by the formula (I)

$$R_1CH=CHR_2O(C_2H_4O)_nR_3 \quad (1)$$

wherein
   $R_1$ is H or $C_{1-18}$ alkyl,
   $R_2$ is selected from the group consisting of a polypropylene oxide chain, alkylene, phenylene, carbonyl, ether, hydrocarbyl containing at least one benzene ring, and hydrocarbyl containing at least one benzene ring and at least one ether group, $R_3$ is selected from the group consisting of H, $C_{1-6}$ alkyl, sulfonyl, an amino group (—$NH_2$), and an ammonium sulfonate group (—$SO_3NH_4$), and n is from 3 to 50; and (b) 0.1 to 30% of a metal salt, based on the weight of the hydrophilic polymer, wherein the metal salt is a salt of a metal selected from the group consisting of a Group IA, a Group IIA, a Group IB, and a Group VIIIB metal; and (2) 1 weight percent to 99 weight percent of a polymer different from the hydrophilic polymer (a).

20. The polymer blend as claimed in claim 19, wherein the polymer (2) is a thermoplastic resin.

21. An insulating material coated with an antistatic layer, comprising an insulating material and an antistatic layer coated thereon, wherein the antistatic layer includes the antistatic polymer blend as claimed in claim 19.

* * * * *